May 19, 1925.
W. R. MILNER
CURTAIN STRETCHER ROD
Filed June 10, 1921
1,538,872
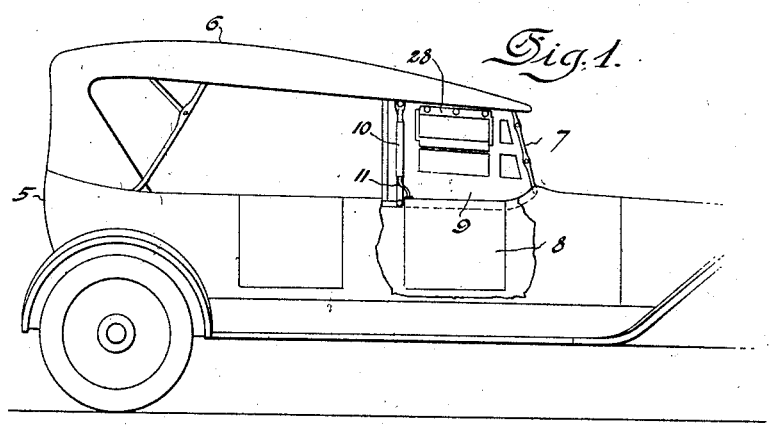
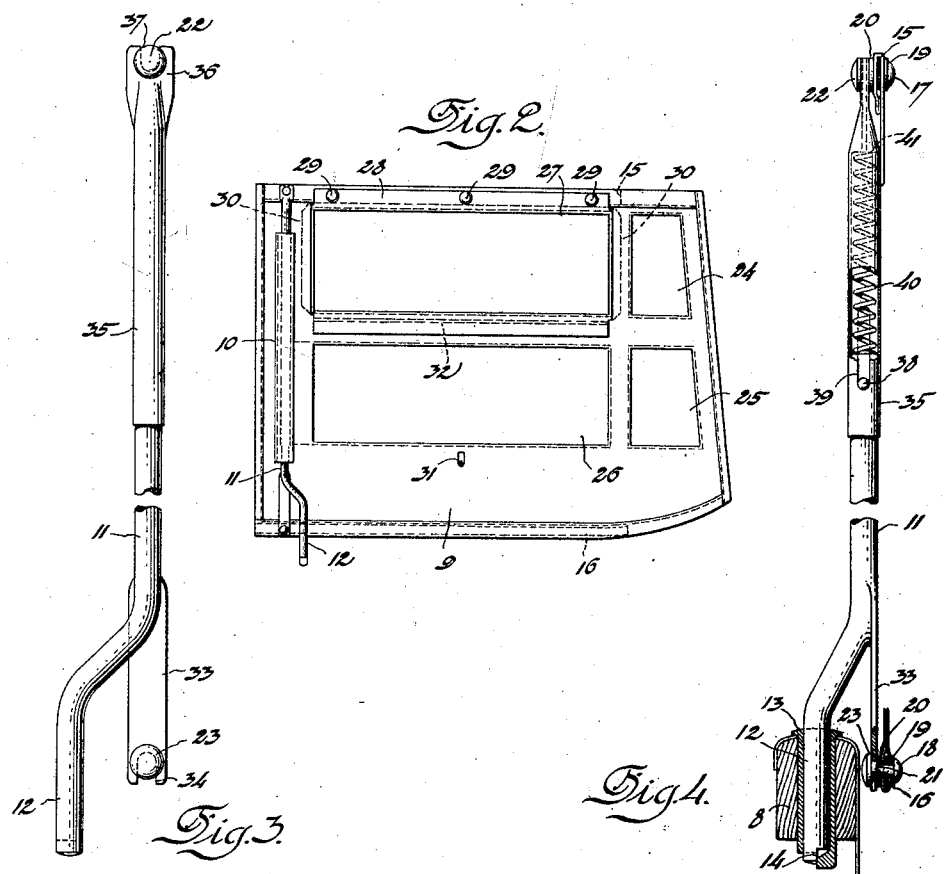
Inventor:
Wilfred R. Milner
By his Attorneys:
Blackmore, Spencer & Flint Patented May 19, 1925.

1,538,872

UNITED STATES PATENT OFFICE.

WILFRED R. MILNER, OF DETROIT, MICHIGAN, ASSIGNOR TO GENERAL MOTORS CORPORATION, OF DETROIT, MICHIGAN, A CORPORATION OF DELAWARE.

CURTAIN-STRETCHER ROD.

Application filed June 10, 1921. Serial No. 476,488.

*To all whom it may concern:*

Be it known that I, WILFRED R. MILNER, a citizen of the United States, and a resident of Detroit, county of Wayne, and State of Michigan, have invented certain new and useful Improvements in Curtain-Stretcher Rods, of which the following is a full, clear, concise, and exact description, such as will enable others skilled in the art to which the invention relates to make and use the same, reference being made therein to the accompanying drawings, which form a part of this specification.

The invention relates to curtain construction and has particular reference to a curtain adapted to be supported in part upon a relatively fixed portion of a vehicle structure and in part upon a vehicle door. Curtains of this character are commonly employed as side curtains for motor vehicles and are generally attached adjacent one of their side edges to the vehicle top or body structure, while the other side edge is supported upon a rod mounted adjacent the free edge of a vehicle door in order that the curtain may swing outwardly and inwardly as the door is opened or closed.

The principal object of my invention is to improve the construction of curtains of this type and supporting mechanism therefor, and particularly to provide means whereby the curtain may be supported in extended position preferably by means operating resiliently to stretch the curtain adjacent its free edge.

A further object is to provide means for permitting ventilation or clear vision through the curtain without in any way interfering with its attachment to the vehicle or with its mounting upon the curtain rod and its maintenance in position thereby.

Further objects and advantages will appear from the following description taken in connection with the accompanying drawings, in which—

Fig. 1 is an elevation with parts cut away showing one embodiment of my invention applied to a motor vehicle;

Fig. 2 is a view upon an enlarged scale of the curtain and curtain rod shown in Fig. 1;

Fig. 3 is an enlarged detail view showing the curtain rod which is a counterpart of that shown in Figs. 1 and 2; and Fig. 4 is an elevation of the rod showing in section its attachment to the curtain and its mounting upon a vehicle door.

Referring to the drawings, Fig. 1 shows a motor vehicle of conventional character having a body 5, a top 6, a windshield 7, and a door 8 which may be hinged at its forward edge to the vehicle body in any usual or suitable manner, the door shown being the one upon the left side of the vehicle. A curtain 9 is shown as being mounted in position upon the vehicle, the forward edge of the curtain being attached in any suitable manner to the windshield 7 or to the body and top at its upper and lower corners adjacent to the forward edge. The rearward edge of the curtain is provided with a fold 10 adapted to slip over and enclose a rod 11, which latter is laterally bent at its lower end 12, which end is adapted to be inserted in a suitable socket 13 formed in the door 8 adjacent its rear edge. The extreme end of the portion 12 may be formed with interlocking means as at 14 engaging with a portion of the socket to prevent relative rotation of the rod and socket by reason of the tension of the curtain.

The curtain will be preferably provided adjacent its upper and lower edges with reinforcing strips 15, 16 which may be constituted of metal bars of sufficient rigidity to prevent sagging of the curtain at the top and drawing upwardly at the bottom. These strips may be and preferably are concealed in suitable pockets formed by folds along or near the upper and lower edges of the curtain and will terminate at the forward ends preferably adjacent to the points vertically above the hinged edge of the door in order to permit the curtain to bend as the door is swung outwardly or inwardly. Adjacent the rear ends of the reinforcing strips and in line with the fold 10 are rivets 17, 18 which serve to fasten together the curtain and the strips, suitable washers 19, 20 being seated on the outer and inner sides of the curtain respectively and held in position between the heads of the rivets and a shoulder 21 as shown in connection with the rivet 18 in Fig. 4. The inner ends of the rivets are enlarged to provide heads 22, 23 by which the upper and lower edges of the curtain respectively are secured to and supported by the rod hereafter described.

Transparent portions 24, 25, 26, 27 of celluloid or the like may be provided as is customary in curtains of this type. In accordance with my invention, I mount the transparent portion 27 in a flap 28 secured at its lower edge to the main portion of the curtain or forming an extension thereof and adapted to be fastened adjacent the upper edge of the curtain as by buttons 29 which may be supported upon the strip 15. The side edges of the flap 28 are preferably extended laterally as at 30, which extended portions will be located upon the outer side of the main curtain when the flap is in closed position thereby covering the opening along the side edges of the flap and preventing the latter from being blown inwardly along the edges. Upon detaching the flap from the fastening means 29 it may be turned inwardly and downwardly and secured in lowered position as by a fastening device 31, thus leaving an opening in the upper portion of the main curtain for ventilation and clear vision, or for other reasons as may be considered desirable. A reinforcing wire or strip 32 may be secured along the hinged edge of the flap 28 to reinforce the edge of the opening when the flap has been lowered.

The curtain rod 11 is provided adjacent its lower end with an extension 33 aligned with the main portion of the rod and having at the lower end thereof a slot 34 adapted to engage under the head 23 on the rivet 18. The upper end of the rod carries a tubular extension 35 the upper end of which is flattened as at 36 and provided with a slot 37 adapted to engage under the head 22 on the rivet 17. The tubular extension 35 fits over the end of the rod 11 and is held in sliding engagement therewith by a pin 38 secured to the rod and fitting in a slot 39 in the said tube. Within the tubular portion of the extension is a coiled spring 40 adapted to force the extension away from the rod by the action of the spring against the end of the rod and against a seat 41 within the tube. Both the rods and the curtains will of course be made as counterparts for the corresponding doors upon opposite sides of the vehicle, the forms shown in Figs. 1 and 2 being those adapted for a forwardly swinging front door on the left side of the vehicle, and the rod shown in Fig. 3 being adapted for use in similar relationship on the right side of the vehicle. The curtains will be modified in form as may be necessary to correspond to the spaces to be occupied thereby or to the part of the vehicle top or body to which they are to be fitted.

It will be understood that the rod as described, with its associated parts, will operate as a stretcher to maintain the upper and lower edges of the curtain or the reinforcing means therein in spaced relation and thereby prevent sagging of the curtain or its deflection by wind or the like from the desired position. The reinforcing means associated with the upper and lower edges of the curtain respectively also serve to maintain the curtain in stretched position under the influence of the resilient distending means associated with the curtain rod, and the strip 15 also serves to maintain the flap 28 in raised or extended position when the latter is secured by the buttons 29.

Various changes may be made in details of construction without departing from the spirit and scope of the invention and therefore I do not desire to be limited to the specific structure herein described except as may be required by the language of the appended claims in view of the prior art.

I claim:

1. A vehicle curtain having a reinforcing bar adjacent its upper edge, a second reinforcing bar adjacent its lower edge, means carried by said bars adjacent their ends adapted to receive stretching devices, said curtain comprising an opening in its upper portion closed by a flap, and means carried by said upper bar to secure the free edge of said flap thereto.

2. A vehicle curtain having an opening therethrough, a flap mounted in position to close said opening, and means for securing said flap detachably to said curtain adjacent to one edge of said opening, said flap provided with flexible extensions adapted to pass through said opening to the side of the curtain opposite that on which the flap is secured and to cover edges of said curtain around said opening.

3. Curtain supporting means comprising a rod section formed at its lower end to engage in a socket in a vehicle door, said section having an extension slotted at its lower end, a tubular section having limited longitudinal movement relatively to said rod section, and spring means tending to extend said sections, the upper end of said tubular section having a slot, whereby said slotted ends may be removably engaged with projections on a side curtain to support and stretch the same.

4. In vehicle curtain construction, the combination of a curtain, reinforcing bars extending along the upper and lower edges respectively of said curtain, and a curtain rod comprising telescoping sections and spring means for extending said sections, said sections being detachably engaged with said bars to support and stretch the curtain, and detachable by longitudinal movement of the sections in a direction to compress said spring means.

5. In vehicle curtain construction, the combination of a curtain having a fold adjacent to one edge thereof, reinforcing bars extending along the upper and lower edges respectively of the curtain, and a curtain rod comprising telescoping sections and a spring arranged to extend said sections, the rod being positioned within said fold and detachably engaged with said bars to stretch and support the curtain, the sections being detachable from the bars by movement in a direction to compress the said spring.

In testimony whereof I affix my signature.

WILFRED R. MILNER.